United States Patent
Imi

(10) Patent No.: US 7,477,773 B2
(45) Date of Patent: Jan. 13, 2009

(54) METHOD FOR INSPECTING A PATTERN AND METHOD FOR MANUFACTURING A SEMICONDUCTOR CHIP HAVING A CIRCUIT PATTERN

(75) Inventor: Satoshi Imi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 669 days.

(21) Appl. No.: 10/965,959

(22) Filed: Oct. 18, 2004

(65) Prior Publication Data
US 2005/0100206 A1 May 12, 2005

(30) Foreign Application Priority Data
Oct. 17, 2003 (JP) ............... 2003-358306

(51) Int. Cl.
*G06K 9/00* (2006.01)
(52) U.S. Cl. ............ 382/145; 382/199; 382/275; 382/294; 438/4; 438/12; 438/14
(58) Field of Classification Search ............ 29/593, 29/846; 250/307, 310, 397; 382/145, 149, 382/199, 147, 266, 275, 294; 438/4, 14, 438/10, 12
See application file for complete search history.

(56) References Cited

U.S. PATENT DOCUMENTS

| 5,828,778 | A  | * | 10/1998 | Hagi et al. ............... 382/145 |
| 6,047,083 | A  | * | 4/2000  | Mizuno .................... 382/141 |
| 6,717,142 | B2 | * | 4/2004  | Hiroi et al. ................ 250/310 |
| 6,799,130 | B2 | * | 9/2004  | Okabe et al. ............... 702/82 |
| 6,839,470 | B2 | * | 1/2005  | Ikeda ....................... 382/266 |
| 6,937,337 | B2 | * | 8/2005  | Ausschnitt et al. .......... 356/401 |
| 6,965,687 | B2 | * | 11/2005 | Sawa et al. ................. 382/149 |
| 7,074,524 | B2 | * | 7/2006  | Yamamoto et al. ........... 430/5 |
| 7,299,394 | B2 | * | 11/2007 | Ichino et al. ............... 714/738 |
| 2002/0038510 | A1 | * | 4/2002  | Savareigo et al. ........... 29/846 |
| 2002/0088940 | A1 | * | 7/2002  | Watanabe et al. ........... 250/310 |
| 2003/0061594 | A1 | * | 3/2003  | Tsuchiya et al. ............ 716/19 |
| 2003/0213893 | A1 | * | 11/2003 | Nagahama et al. ......... 250/210 |
| 2005/0038618 | A1 | * | 2/2005  | Tanaka et al. .............. 702/83 |
| 2005/0100206 | A1 | * | 5/2005  | Imi ........................... 382/145 |

FOREIGN PATENT DOCUMENTS

JP 2001-84379 3/2001

* cited by examiner

*Primary Examiner*—Gregory M Desire
(74) *Attorney, Agent, or Firm*—Finnegan, Henderson, Farabow, Garrett & Dunner, L.L.P.

(57) ABSTRACT

A method for inspecting a pattern includes measuring, in a first direction, a width of a reference pattern at plural positions in the reference patter; measuring, in a second direction, a width of the reference pattern at the plural positions. Comparing the first and second width and determining which of the first and second widths is shortest; extracting a defect in a pattern to be inspected; and evaluating the extracted defect depending on the determined direction.

5 Claims, 13 Drawing Sheets

FIG. 3

| 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 4 | 4 | 4 | 4 | 4 | 4 | 4 | 4 | 4 |
| 0 | 0 | 0 | 0 | 0 | 0 | 0 | 0 | 0 | 0 | 4 | 4 | 4 | 4 | 4 | 4 | 4 | 4 | 4 | 4 |
| 0 | 0 | 0 | 0 | 0 | 0 | 0 | 0 | 0 | 4 | 4 | 4 | 4 | 4 | 4 | 4 | 4 | 4 | 4 | 4 |
| 0 | 0 | 0 | 0 | 0 | 0 | 0 | 0 | 4 | 4 | 4 | 4 | 4 | 4 | 4 | 4 | 4 | 4 | 4 | 4 |
| 0 | 0 | 0 | 0 | 0 | 0 | 0 | 4 | 4 | 4 | 4 | 0 | 0 | 0 | 0 | 0 | 0 | 0 | 0 | 0 |
| 0 | 0 | 0 | 0 | 0 | 0 | 4 | 4 | 4 | 4 | 0 | 0 | 0 | 0 | 0 | 0 | 0 | 0 | 0 | 0 |
| 0 | 0 | 0 | 0 | 0 | 4 | 4 | 4 | 4 | 0 | 0 | 0 | 0 | 0 | 0 | 0 | 0 | 0 | 0 | 0 |
| 0 | 0 | 0 | 0 | 4 | 4 | 4 | 4 | 0 | 0 | 0 | 0 | 0 | 0 | 0 | 0 | 0 | 0 | 0 | 0 |
| 0 | 0 | 0 | 4 | 4 | 4 | 4 | 0 | 0 | 0 | 0 | 0 | 0 | 0 | 0 | 0 | 0 | 0 | 0 | 0 |
| 0 | 0 | 4 | 4 | 4 | 4 | 0 | 0 | 0 | 0 | 0 | 0 | 0 | 0 | 0 | 0 | 0 | 0 | 0 | 0 |
| 0 | 3 | 4 | 4 | 4 | 0 | 0 | 0 | 0 | 0 | 0 | 0 | 0 | 0 | 0 | 0 | 0 | 0 | 0 | 0 |
| 1 | 3 | 4 | 4 | 0 | 0 | 0 | 0 | 0 | 0 | 0 | 0 | 0 | 0 | 0 | 0 | 0 | 0 | 0 | 0 |
| 0 | 3 | 4 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |

FIG.4

| | | | | | | | | | | | | | | | | | | | | |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 12 | 12 | 13 | 13 | 4 | 4 | 4 | 4 | 4 | 4 |
| 0 | 0 | 0 | 0 | 0 | 0 | 0 | 0 | 0 | 0 | 12 | 12 | 13 | 13 | 4 | 4 | 4 | 4 | 4 | 4 | 4 |
| 0 | 0 | 0 | 0 | 0 | 0 | 0 | 0 | 0 | 12 | 12 | 13 | 13 | 4 | 4 | 4 | 4 | 4 | 4 | 4 | 4 |
| 0 | 0 | 0 | 0 | 0 | 0 | 0 | 0 | 12 | 12 | 13 | 13 | 4 | 4 | 4 | 4 | 4 | 4 | 4 | 4 | 4 |
| 0 | 0 | 0 | 0 | 0 | 0 | 0 | 12 | 12 | 13 | 13 | 0 | 0 | 0 | 0 | 0 | 0 | 0 | 0 | 0 | 0 |
| 0 | 0 | 0 | 0 | 0 | 0 | 12 | 12 | 13 | 13 | 0 | 0 | 0 | 0 | 0 | 0 | 0 | 0 | 0 | 0 | 0 |
| 0 | 0 | 0 | 0 | 0 | 12 | 12 | 13 | 13 | 0 | 0 | 0 | 0 | 0 | 0 | 0 | 0 | 0 | 0 | 0 | 0 |
| 0 | 0 | 0 | 0 | 12 | 12 | 13 | 13 | 0 | 0 | 0 | 0 | 0 | 0 | 0 | 0 | 0 | 0 | 0 | 0 | 0 |
| 0 | 0 | 0 | 12 | 12 | 13 | 13 | 0 | 0 | 0 | 0 | 0 | 0 | 0 | 0 | 0 | 0 | 0 | 0 | 0 | 0 |
| 0 | 0 | 12 | 12 | 13 | 13 | 0 | 0 | 0 | 0 | 0 | 0 | 0 | 0 | 0 | 0 | 0 | 0 | 0 | 0 | 0 |
| 0 | 12 | 12 | 13 | 13 | 0 | 0 | 0 | 0 | 0 | 0 | 0 | 0 | 0 | 0 | 0 | 0 | 0 | 0 | 0 | 0 |
| 12 | 12 | 13 | 13 | 0 | 0 | 0 | 0 | 0 | 0 | 0 | 0 | 0 | 0 | 0 | 0 | 0 | 0 | 0 | 0 | 0 |
| 0 | 13 | 13 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 5

| 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 11 | 11 | 11 | 11 | 11 | 11 | 11 | 11 | 11 | 11 |
| 0 | 0 | 0 | 0 | 0 | 0 | 0 | 0 | 0 | 0 | 12 | 12 | 12 | 12 | 12 | 12 | 12 | 12 | 12 | 12 | 12 |
| 0 | 0 | 0 | 0 | 0 | 0 | 0 | 0 | 0 | 13 | 13 | 13 | 13 | 13 | 13 | 13 | 13 | 13 | 13 | 13 | 13 |
| 0 | 0 | 0 | 0 | 0 | 0 | 0 | 0 | 14 | 14 | 14 | 14 | 14 | 14 | 14 | 14 | 14 | 14 | 14 | 14 | 14 |
| 0 | 0 | 0 | 0 | 0 | 0 | 0 | 4 | 4 | 4 | 4 | 0 | 0 | 0 | 0 | 0 | 0 | 0 | 0 | 0 | 0 |
| 0 | 0 | 0 | 0 | 0 | 0 | 4 | 4 | 4 | 4 | 0 | 0 | 0 | 0 | 0 | 0 | 0 | 0 | 0 | 0 | 0 |
| 0 | 0 | 0 | 0 | 0 | 4 | 4 | 4 | 4 | 0 | 0 | 0 | 0 | 0 | 0 | 0 | 0 | 0 | 0 | 0 | 0 |
| 0 | 0 | 0 | 0 | 4 | 4 | 4 | 4 | 0 | 0 | 0 | 0 | 0 | 0 | 0 | 0 | 0 | 0 | 0 | 0 | 0 |
| 0 | 0 | 0 | 4 | 4 | 4 | 4 | 0 | 0 | 0 | 0 | 0 | 0 | 0 | 0 | 0 | 0 | 0 | 0 | 0 | 0 |
| 0 | 0 | 4 | 4 | 4 | 4 | 0 | 0 | 0 | 0 | 0 | 0 | 0 | 0 | 0 | 0 | 0 | 0 | 0 | 0 | 0 |
| 0 | 4 | 4 | 4 | 4 | 0 | 0 | 0 | 0 | 0 | 0 | 0 | 0 | 0 | 0 | 0 | 0 | 0 | 0 | 0 | 0 |
| 4 | 4 | 4 | 4 | 0 | 0 | 0 | 0 | 0 | 0 | 0 | 0 | 0 | 0 | 0 | 0 | 0 | 0 | 0 | 0 | 0 |
| 0 | 2 | 2 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 6

| 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 4 | 4 | 4 | 4 | 4 | 4 | 4 | 4 | 4 | 4 |
| 0 | 0 | 0 | 0 | 0 | 0 | 0 | 0 | 0 | 0 | 3 | 3 | 4 | 4 | 4 | 4 | 4 | 4 | 4 | 4 | 4 |
| 0 | 0 | 0 | 0 | 0 | 0 | 0 | 0 | 0 | 2 | 2 | 3 | 3 | 4 | 4 | 4 | 4 | 4 | 4 | 4 | 4 |
| 0 | 0 | 0 | 0 | 0 | 0 | 0 | 0 | 2 | 2 | 2 | 2 | 3 | 3 | 4 | 4 | 4 | 4 | 4 | 4 | 4 |
| 0 | 0 | 0 | 0 | 0 | 0 | 0 | 2 | 2 | 2 | 2 | 0 | 0 | 0 | 0 | 0 | 0 | 0 | 0 | 0 | 0 |
| 0 | 0 | 0 | 0 | 0 | 0 | 2 | 2 | 2 | 2 | 0 | 0 | 0 | 0 | 0 | 0 | 0 | 0 | 0 | 0 | 0 |
| 0 | 0 | 0 | 0 | 0 | 2 | 2 | 2 | 2 | 0 | 0 | 0 | 0 | 0 | 0 | 0 | 0 | 0 | 0 | 0 | 0 |
| 0 | 0 | 0 | 0 | 2 | 2 | 2 | 2 | 0 | 0 | 0 | 0 | 0 | 0 | 0 | 0 | 0 | 0 | 0 | 0 | 0 |
| 0 | 0 | 0 | 2 | 2 | 2 | 2 | 0 | 0 | 0 | 0 | 0 | 0 | 0 | 0 | 0 | 0 | 0 | 0 | 0 | 0 |
| 0 | 0 | 2 | 2 | 2 | 2 | 0 | 0 | 0 | 0 | 0 | 0 | 0 | 0 | 0 | 0 | 0 | 0 | 0 | 0 | 0 |
| 0 | 2 | 2 | 2 | 2 | 0 | 0 | 0 | 0 | 0 | 0 | 0 | 0 | 0 | 0 | 0 | 0 | 0 | 0 | 0 | 0 |
| 2 | 2 | 2 | 2 | 0 | 0 | 0 | 0 | 0 | 0 | 0 | 0 | 0 | 0 | 0 | 0 | 0 | 0 | 0 | 0 | 0 |
| 0 | 2 | 2 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 7

| | | | | | | | | | | | | A | | | | | B | | | |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 1 | 1 | 1 | 1 | 1 | 1 | 1 | 1 | 1 | 1 |
| 0 | 0 | 0 | 0 | 0 | 0 | 0 | 0 | 0 | 0 | 4 | 4 | 1 | 1 | 1 | 1 | ① | 1 | 1 | 1 | 1 |
| 0 | 0 | 0 | 0 | 0 | 0 | 0 | 0 | 0 | 4 | 4 | 4 | ④ | 1 | 1 | 1 | 1 | 1 | 1 | 1 | 1 |
| 0 | 0 | 0 | 0 | 0 | 0 | 0 | 0 | 4 | 4 | 4 | 4 | 4 | 1 | 1 | 1 | 1 | 1 | 1 | 1 | 1 |
| 0 | 0 | 0 | 0 | 0 | 0 | 0 | 4 | 4 | 4 | 4 | 0 | 0 | 0 | 0 | 0 | 0 | 0 | 0 | 0 | 0 |
| 0 | 0 | 0 | 0 | 0 | 0 | 4 | 4 | 4 | 4 | 0 | 0 | 0 | 0 | 0 | 0 | 0 | 0 | 0 | 0 | 0 |
| 0 | 0 | 0 | 0 | 0 | 4 | 4 | 4 | 4 | 0 | 0 | 0 | 0 | 0 | 0 | 0 | 0 | 0 | 0 | 0 | 0 |
| 0 | 0 | 0 | 0 | 4 | 4 | 4 | 4 | 0 | 0 | 0 | 0 | 0 | 0 | 0 | 0 | 0 | 0 | 0 | 0 | 0 |
| 0 | 0 | 0 | 4 | 4 | 4 | 4 | 0 | 0 | 0 | 0 | 0 | 0 | 0 | 0 | 0 | 0 | 0 | 0 | 0 | 0 |
| 0 | 0 | 4 | 4 | 4 | 4 | 0 | 0 | 0 | 0 | 0 | 0 | 0 | 0 | 0 | 0 | 0 | 0 | 0 | 0 | 0 |
| 0 | 4 | 4 | 4 | 4 | 0 | 0 | 0 | 0 | 0 | 0 | 0 | 0 | 0 | 0 | 0 | 0 | 0 | 0 | 0 | 0 |
| 4 | 4 | 4 | 4 | 0 | 0 | 0 | 0 | 0 | 0 | 0 | 0 | 0 | 0 | 0 | 0 | 0 | 0 | 0 | 0 | 0 |
| 0 | 4 | 4 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 8

| | | | | | | | | | | | | | A | | | | B | | | |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 4 | 4 | 4 | 4 | 4 | 4 | 4 | 4 | 4 | 4 |
| 0 | 0 | 0 | 0 | 0 | 0 | 0 | 0 | 0 | 0 | 3 | 3 | 4 | 4 | 4 | 4 | 4 | ④ | 4 | 4 | 4 |
| 0 | 0 | 0 | 0 | 0 | 0 | 0 | 0 | 0 | 2 | 2 | 3 | ③ | 4 | 4 | 4 | 4 | 4 | 4 | 4 | 4 |
| 0 | 0 | 0 | 0 | 0 | 0 | 0 | 0 | 2 | 2 | 2 | 2 | 3 | 3 | 4 | 4 | 4 | 4 | 4 | 4 | 4 |
| 0 | 0 | 0 | 0 | 0 | 0 | 0 | 2 | 2 | 2 | 2 | 0 | 0 | 0 | 0 | 0 | 0 | 0 | 0 | 0 | 0 |
| 0 | 0 | 0 | 0 | 0 | 0 | 2 | 2 | 2 | 2 | 0 | 0 | 0 | 0 | 0 | 0 | 0 | 0 | 0 | 0 | 0 |
| 0 | 0 | 0 | 0 | 0 | 2 | 2 | 2 | 2 | 0 | 0 | 0 | 0 | 0 | 0 | 0 | 0 | 0 | 0 | 0 | 0 |
| 0 | 0 | 0 | 0 | 2 | 2 | 2 | 2 | 0 | 0 | 0 | 0 | 0 | 0 | 0 | 0 | 0 | 0 | 0 | 0 | 0 |
| 0 | 0 | 0 | 2 | 2 | 2 | 2 | 0 | 0 | 0 | 0 | 0 | 0 | 0 | 0 | 0 | 0 | 0 | 0 | 0 | 0 |
| 0 | 0 | 2 | 2 | 2 | 2 | 0 | 0 | 0 | 0 | 0 | 0 | 0 | 0 | 0 | 0 | 0 | 0 | 0 | 0 | 0 |
| 0 | 2 | 2 | 2 | 2 | 0 | 0 | 0 | 0 | 0 | 0 | 0 | 0 | 0 | 0 | 0 | 0 | 0 | 0 | 0 | 0 |
| 2 | 2 | 2 | 2 | 0 | 0 | 0 | 0 | 0 | 0 | 0 | 0 | 0 | 0 | 0 | 0 | 0 | 0 | 0 | 0 | 0 |
| 0 | 2 | 1 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |

| 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 12 | 12 | 13 | 13 | 4 | 4 | 4 | 4 | 4 | 4 |
| 0 | 0 | 0 | 0 | 0 | 0 | 0 | 0 | 0 | 0 | 12 | 12 | 13 | 13 | 4 | 4 | 4 | 4 | 4 | 4 | 4 |
| 0 | 0 | 0 | 0 | 0 | 0 | 0 | 0 | 0 | 12 | 12 | 13 | 13 | 4 | 4 | 4 | 4 | 4 | 4 | 4 | 4 |
| 0 | 0 | 0 | 0 | 0 | 0 | 0 | 0 | 12 | 12 | 13 | 13 | 4 | 4 | 4 | 4 | 4 | 4 | 4 | 4 | 4 |
| 0 | 0 | 0 | 0 | 0 | 0 | 0 | 12 | 12 | 13 | 13 | 0 | 0 | 0 | 0 | 0 | 0 | 0 | 0 | 0 | 0 |
| 0 | 0 | 0 | 0 | 0 | 0 | 12 | 12 | 13 | 13 | 0 | 0 | 0 | 0 | 0 | 0 | 0 | 0 | 0 | 0 | 0 |
| 0 | 0 | 0 | 0 | 0 | 12 | 12 | 13 | 13 | 0 | 0 | 0 | 0 | 0 | 0 | 0 | 0 | 0 | 0 | 0 | 0 |
| 0 | 0 | 0 | 0 | 12 | 12 | 13 | 13 | 0 | 0 | 0 | 0 | 0 | 1 | 2 | 3 | 4 | 5 | 6 | 3 | 3 |
| 0 | 0 | 0 | 12 | 12 | 13 | 13 | 0 | 0 | 0 | 0 | 0 | 0 | 2 | 3 | 4 | 5 | 6 | 3 | 3 | 3 |
| 0 | 0 | 12 | 12 | 13 | 13 | 0 | 0 | 0 | 0 | 0 | 0 | 0 | 3 | 4 | 5 | 6 | 3 | 3 | 3 | 3 |
| 0 | 12 | 12 | 13 | 13 | 0 | 0 | 0 | 0 | 0 | 0 | 0 | 0 | 4 | 5 | 6 | 0 | 0 | 0 | 0 | 0 |
| 12 | 12 | 13 | 13 | 0 | 0 | 0 | 0 | 0 | 0 | 0 | 0 | 0 | 5 | 6 | 3 | 0 | 0 | 0 | 0 | 0 |
| 0 | 13 | 13 | 0 | 0 | 0 | 0 | 0 | 0 | 0 | 0 | 0 | 0 | 6 | 3 | 3 | 0 | 0 | 0 | 0 | 0 |
| 0 | 0 | 0 | 0 | 0 | 0 | 0 | 0 | 0 | 0 | 0 | 0 | 0 | 3 | 3 | 3 | 0 | 0 | 0 | 0 | 0 |

FIG. 12

| 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 12 | 12 | 13 | 13 | 4 | 4 | 4 | 4 | 4 | 4 |
| 0 | 0 | 0 | 0 | 0 | 0 | 0 | 0 | 0 | 0 | 12 | 12 | 13 | 13 | 4 | 4 | 4 | 4 | 4 | 4 | 4 |
| 0 | 0 | 0 | 0 | 0 | 0 | 0 | 0 | 0 | 12 | 12 | 13 | 13 | 4 | 4 | 4 | 4 | 4 | 4 | 4 | 4 |
| 0 | 0 | 0 | 0 | 0 | 0 | 0 | 0 | 12 | 12 | 13 | 13 | 4 | 4 | 4 | 4 | 4 | 4 | 4 | 4 | 4 |
| 0 | 0 | 0 | 0 | 0 | 0 | 0 | 12 | 12 | 13 | 13 | 0 | 0 | 0 | 0 | 0 | 0 | 0 | 0 | 0 | 0 |
| 0 | 0 | 0 | 0 | 0 | 0 | 12 | 12 | 13 | 13 | 0 | 0 | 0 | 0 | 0 | 0 | 0 | 0 | 0 | 0 | 0 |
| 0 | 0 | 0 | 0 | 0 | 12 | 12 | 13 | 13 | 0 | 0 | 0 | 0 | 0 | 0 | 0 | 0 | 0 | 0 | 0 | 0 |
| 0 | 0 | 0 | 0 | 12 | 12 | 13 | 13 | 0 | 0 | 0 | 0 | 0 | 0 | 0 | 0 | 0 | 0 | 3 | 3 | 3 |
| 0 | 0 | 0 | 12 | 12 | 13 | 13 | 0 | 0 | 0 | 0 | 0 | 0 | 0 | 0 | 0 | 0 | 3 | 3 | 3 | 3 |
| 0 | 0 | 12 | 12 | 13 | 13 | 0 | 0 | 0 | 0 | 0 | 0 | 0 | 0 | 0 | 0 | 3 | 3 | 3 | 3 | 3 |
| 0 | 12 | 12 | 13 | 13 | 0 | 0 | 0 | 0 | 0 | 0 | 0 | 0 | 0 | 0 | 0 | 0 | 0 | 0 | 0 | 0 |
| 12 | 12 | 13 | 13 | 0 | 0 | 0 | 0 | 0 | 0 | 0 | 0 | 0 | 0 | 3 | 0 | 0 | 0 | 0 | 0 | 0 |
| 0 | 13 | 13 | 0 | 0 | 0 | 0 | 0 | 0 | 0 | 0 | 0 | 0 | 3 | 3 | 0 | 0 | 0 | 0 | 0 | 0 |
| 0 | 0 | 0 | 0 | 0 | 0 | 0 | 0 | 0 | 0 | 0 | 0 | 3 | 3 | 3 | 0 | 0 | 0 | 0 | 0 | 0 |

METHOD FOR INSPECTING A PATTERN AND METHOD FOR MANUFACTURING A SEMICONDUCTOR CHIP HAVING A CIRCUIT PATTERN

CROSS REFERENCE TO RELATED APPLICATION

This application is based upon and claims the benefit of priority from prior Japanese Patent Application No. 2003-358306 filed on Oct. 17, 2004, the entire contents of which are incorporated herein by reference.

BACKGROUND

1. Technical Field

The present invention relates to a method for inspecting a pattern and a method for manufacturing a semiconductor chip having a circuit pattern.

2. Description of the Related Art

As a way to miniaturize an information technology device, a package in which a chip such as a semiconductor chip is directly mounted on a substrate, becomes popular. In this package, a dust on a pattern of the chip can cause a contact failure or poor characteristics. As a result, it is necessary to inspect the pattern to determine whether there is a significant defect in the chip before mounting it on the substrate.

A method of inspecting a pattern is shown in Japanese Patent Publication No. 2001-84379, where a pattern to be inspected is compared with a reference pattern obtained by imaging a non-defective pattern. Then, the differences between these patterns are acquired. An area where the difference is large is extracted as a defect region. Next, the size of the defect region is compared with a threshold value which is set in advance.

The threshold value differs according to a position in the pattern, because the density of the fine circuit pattern on the chip usually differs according to a position in the pattern. In other words, the complexity of the shape of the pattern causes a variation of the density and a necessity of fine segmentation of the pattern.

As a result, it is necessary to set a large number of threshold values according to positions in the pattern. Such setting takes a long time, resulting in lowering a working efficiency.

SUMMARY

One aspect of the present invention is a method for inspecting a pattern. The method comprises measuring in a first direction, a first pattern width of a reference pattern at plural positions in the reference pattern, measuring in a second direction, a second pattern width of the reference pattern at the plural positions in the reference pattern, comparing the first and second pattern widths at each of the plural positions to determine a shortest pattern width among the first and second pattern widths at each of the plural positions, extracting a defect in a pattern to be inspected, and evaluating the defect based on the determined shortest pattern width of the position corresponding to a position of the defect.

In another aspect consistent with the present invention, there is provided a method for manufacturing a semiconductor chip. The method comprises fabricating a semiconductor chip having a circuit pattern, inspecting the circuit pattern, said inspection comprising, measuring, in a first direction, a first pattern width of a reference pattern at plural positions in the reference pattern, measuring, in a second direction, a second pattern width of the reference pattern at the plural positions in the reference pattern, comparing the first and second pattern widths at each of the plural positions to determine a shortest pattern width among the first and second pattern widths at each of the plural positions, extracting a defect in the circuit pattern to be inspected, evaluating the defect based on the determined shortest pattern width of the position corresponding to a position of the defect, and mounting the semiconductor chip on a substrate.

BRIEF DESCRIPTION OF THE DRAWING

FIG. 3 shows 0-degree directional scanned data.
FIG. 4 shows 45-degree directional scanned data.
FIG. 5 shows 90-degree directional scanned data.
FIG. 6 shows 135-degree directional scanned data.
FIG. 7 shows directional image data.
FIG. 8 shows pattern width data.
FIG. 9 shows sensitivity image data.
FIG. 11 shows another 45-degree directional scanned data.
FIG. 12 shows the another 45-degree directional scanned data after a gradation correction.

DESCRIPTION

An embodiment consistent with the present invention is explained next with respect to FIGS. 1 to 9.

Figure 1:
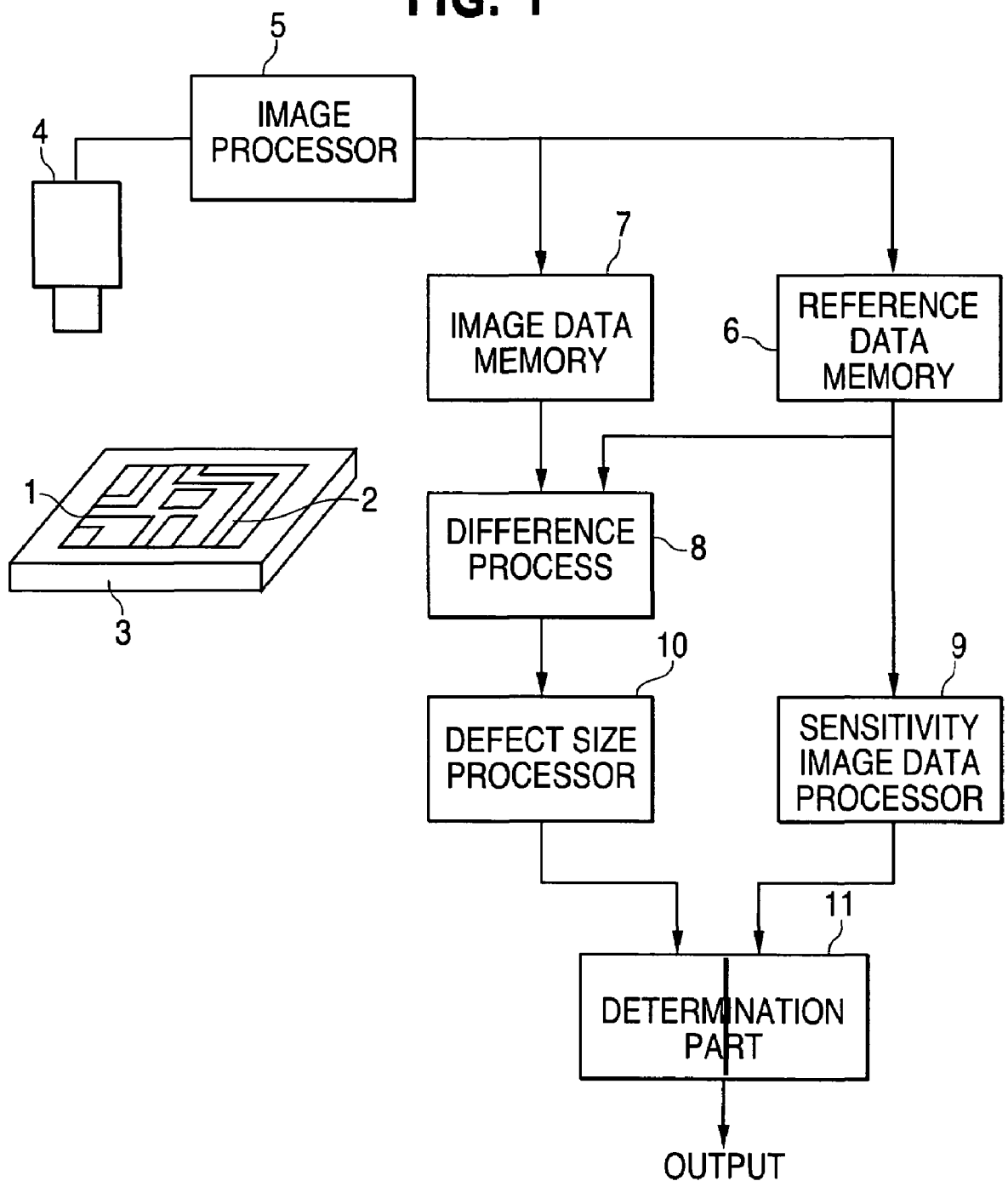
FIG. 1 is a schematic diagram of an inspecting apparatus.

FIG. 1 is a schematic diagram of an inspecting apparatus 100.

A semiconductor chip 1 is set on a table 3. A circuit pattern 2 is formed on chip 1. In addition to chip 1 to be inspected, another chip (not shown) with a non-defective pattern is prepared in order to obtain reference data.

A CCD camera 4 is arranged above chip 1. CCD camera 4 images circuit pattern 2 of chip 1 and outputs an image signal thereof. The outputted image signal constitutes a matrix form corresponding to pixels of camera 4. In this embodiment, a longitudinal direction corresponds to a row direction of the matrix, and a lateral direction corresponds to a latitudinal (column) direction of the matrix. An oblique direction is defined as a direction inclined in respect to both the row and latitudinal directions.

The image signal outputted from CCD camera 4 is inputted to an image processor 5. Image processor 5 stores an image signal of a good chip with a non-defective pattern as reference data in a reference data memory 6. CCD camera 4 sequentially images plural chips 1 to be inspected. Plural image signal of chips 1 are inputted to and stored as image data in an image data memory 7. When reference data is stored in reference data memory 6 in advance, it is not necessary to image a good chip to obtain reference data.

A difference processor 8 reads reference data stored in memory 6 and image data stored in memory 7, and then computes a difference between these data to obtain differential image data. The difference is, in other words, the difference of a contrast level between these data.

A sensitivity image data processor 9 also reads the reference data and codes it according to a width of the pattern to create sensitivity image data, which will be used to inspect the image data. The sensitivity data shows a sensitivity of detection. The value of the sensitivity data differs according to a value of data created by coding the reference data based on a width of the pattern.

The sensitivity image data is created as described next. First, the reference data is binarized based on a constant threshold value. The binarized reference data constitutes a matrix of pixel values where each pixel value is a white level or black level.

Then, the specific direction in which the number of pixels continuously having the same level (white or black level) is the smallest, is defined, by linearly scanning pixels in several directions. Finally, directional image data showing the specific direction, is produced by coding the reference data.

Figure 2:
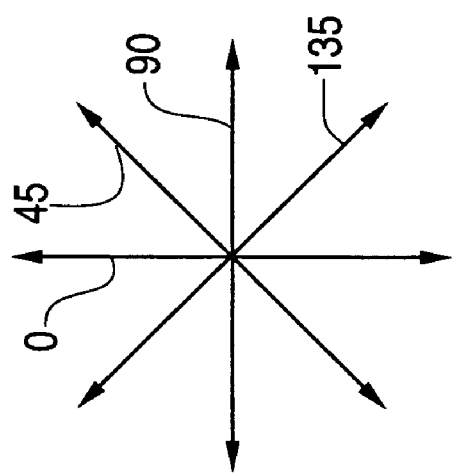
FIG. 2 shows binarized reference data.
Figure 2:
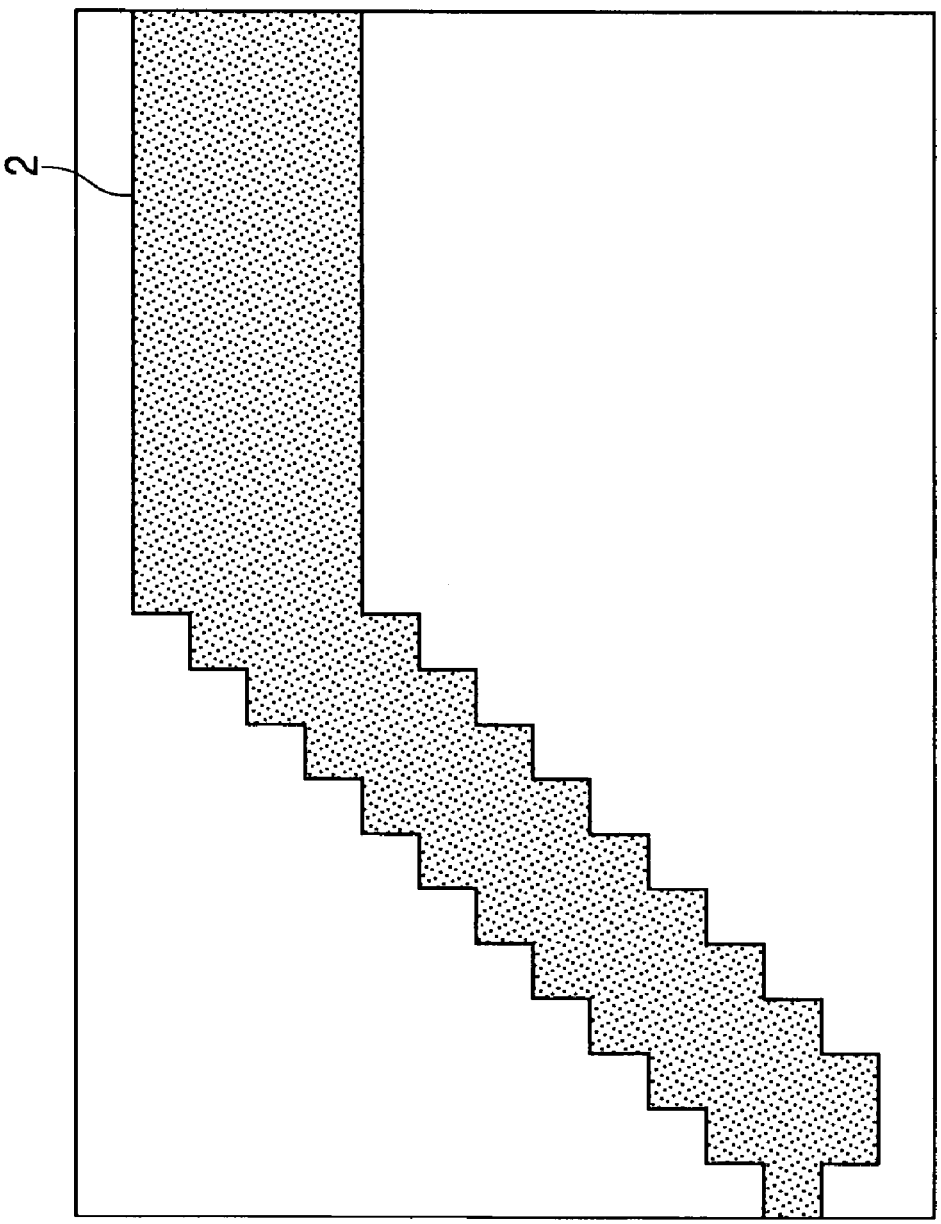

FIG. 2 shows a modified example of the binarized reference data. Pixels corresponding to metal circuit pattern 2 (FIG. 1) have a black level in this figure.

Sensitivity image data processor 9 (FIG. 1) scans the binarized reference data in the 0-degree direction (a first direction) shown in FIG. 2 to count the number of pixels (a first pattern width) which continuously have black levels in the 0-degree direction. Processor 9 codes the binarized reference data according to the counted number of the pixels.

FIG. 3 shows the coded reference data, which is referred to herein as 0-degree directional scanned data. The number of the counted pixels, which corresponds to the first pattern width, is given to each pixel (several positions) in the reference pattern.

For instance, the number of the leftmost pixel of the black level is only one, so that 1 is the coded value of the pixel in FIG. 3. In the adjacent line, the number of the black level pixel is three in the 0-degree direction, so that 3 is the coded value of the pixels.

In addition to the 0-degree direction, sensitivity image data processor 9 scans the binarized reference data in the 45-degree direction (a third direction), the 90-degree direction (a second direction) and the 135-degree direction (a fourth direction). FIG. 4 shows 45-degree directional scanned data. FIG. 5 shows 90-degree directional scanned data. FIG. 6 shows 135-degree directional scanned data. As shown in FIGS. 4-6, the numbers of the counted pixels, which respectively correspond to the third, second and fourth pattern widths, are given to each pixel (several positions) in the reference pattern.

An arrow 0 (FIG. 2) corresponds to the zero-degree direction. Similarly, arrows 45, 90 and 135 respectively correspond to the 45-degree direction, 90-degree direction and 135-degree direction. The 45-degree and 135-degree directions are examples of an oblique direction. Another angle other than 45-degree and 135-degree may be applied when scanning in another oblique direction.

Sensitivity image data processor 9 further decides the specific direction (a pattern width direction) among those four directions in which the number of the pixels continuously having the black level is the smallest. When the specific direction is the zero-degree direction, processor 9 applies 1 to that pixel. Similarly, when the specific direction is the 45-degree, 90-degree or 135-degree directions, processor 9 respectively applies 2, 3 or 4 to that pixel. In addition, 0 is given to a pixel which has a white level.

FIG. 7 shows directional image data produced by coding the reference data according to the specific direction.

With respect to a pixel A in FIG. 7, the number of the continuous black level is four in the zero-degree direction, 13 in the 45-degree direction, 13 in the 90-degree direction and 3 in the 135-degree direction so that 4, which corresponds to the 135-degree direction, is given to the pixel A. Similarly, the code 1, which corresponds to the 0-degree direction is given to a pixel B.

Sensitivity image data processor 9 then produces pattern width data by giving each pixel the number of the pixels continuously having the black level in the specific direction. The specific direction is referred to herein as the pattern width direction, and the number of the pixels as the minimum pattern width. FIG. 8 shows the pattern width data. The pixel given 0 in the directional image data (FIG. 7), is also given 0 as shown in FIG. 8.

In FIG. 8, the pixel A is given 3 because the number of the pixels having a black level is 3 in the 135-degree direction, which direction corresponds to 4 in FIG. 7. Similarly, 4 is given to the pixel B because the number of the pixels having a black level is 4 in the 0-degree direction.

Sensitivity image data processor 9 finally produces sensitivity image data using the pattern width data. Processor 9 adjusts each value of the pattern width data to produce sensitivity image data.

Figure 9:
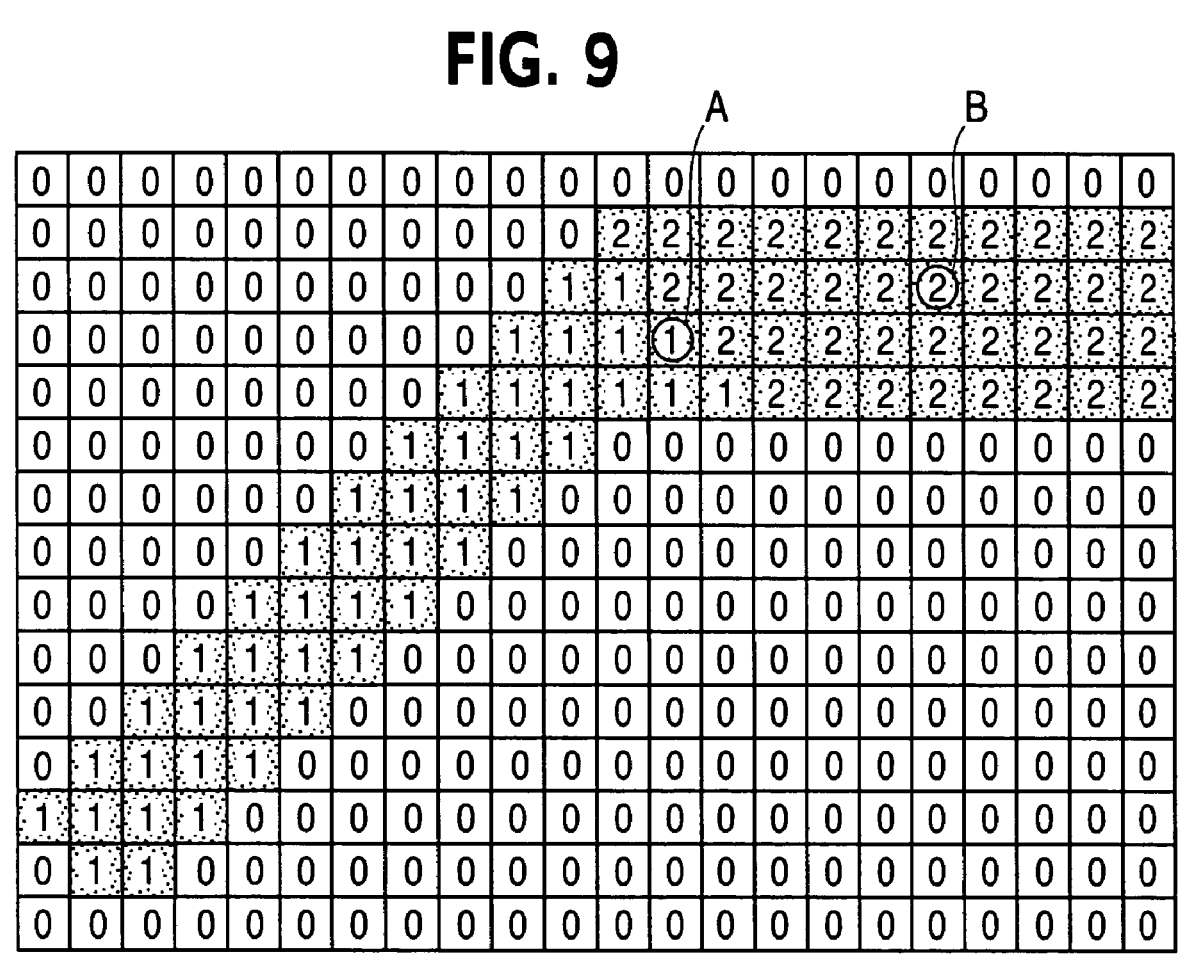

For example, when it is necessary to detect a defect whose size is larger than a half width of the pattern, the sensitivity is set to be a factor of 0.5. In other words, as shown in FIG. 9, processor 9 (FIG. 1) produces sensitivity image data by halving the values of each pixels of the pattern width data (FIG. 8). When the value is an odd number, a fraction after the decimal point is omitted in this embodiment.

In FIG. 9, 1 is given to the pixel A whose pattern width value is 3, after omitting the fraction after the decimal point. Similarly, the pixel B whose pattern width value is 4 is given 2 after applying the sensitivity factor 0.5.

The sensitivity can be set to a factor other than 0.5, depending on a size of a defect to be inspected, or a kind of inspection.

Defect size processor 10 (FIG. 1) receives the differential data obtained by difference processor 8, and extracts a defect based on the value of the difference. Then, processor 10 produces defect size data based on the width, in the pattern width direction, of the defect.

In this embodiment, processor 10 (FIG. 1) extracts a defect existing by only considering pixels which have black levels (FIG. 2) after binarizing the image data with a predetermined threshold value.

More particularly, processor 10 reads the specified directions of pixels where a defect is detected (usually an area of a defect is larger than that of a pixel). Then, processor 10 counts (measures) the width of the defect to obtain the pattern width data, against each pixel where a defect is detected, by respectively scanning the differential data in the specified directions. Processor 10 applies the counted number to each corresponding pixel so that the defect size data is generated.

A determination part 11 receives the defect size data from processor 10 and the sensitivity image data from processor 9, and compares them. When there is a pixel (position) whose value of the defect size data is larger than that of the pixel value of the corresponding pixel (position) of the sensitivity image data, the inspected pattern is considered to have a considerable defect.

In summary, scanning the reference data in the 4 directions, 0-degree, 45-degree, 90-degree and 135-degree directions, the numbers of the pixels which continuously have black levels can be counted in the 4 directions. Then, the pattern width direction in which the counted number is the smallest can be decided so that the smallest pattern width can be obtained. Separately, the reference image data is converted to the sensitivity image data whose value depends on the pattern width.

The defect size data is meanwhile produced by extracting a defect according to the differential image data, and by obtaining the width of the defect in the pattern width direction. Finally, existence of a considerable defect can be detected by comparing the defect size data with the sensitivity image data.

In other words, the defect is evaluated using the specific direction of the pixel where the defect exists to determine whether the size of the defect is considerable.

In this embodiment, since the sensitivity image data whose value depends on the pattern width is automatically produced, a considerable defect can be detected even though circuit pattern 2 has a complicated pattern or the density of circuit pattern 2 differs according to the location in pattern 2. Even though circuit pattern 2 has a portion which extends obliquely, a considerable defect can be detected because the reference data is scanned not only in the longitudinal direction, but also in an oblique direction. Further, regardless of the number of areas to be inspected, an efficient inspection can be executed because of automatically producing the sensitivity image data which depends on the pattern width. In other words, a method of this embodiment can improve efficiency because it takes less time to inspect a pattern.

Numerous modifications of the present invention are possible in light of the above teachings. It is therefore to be understood that, within the scope of the appended claims, the present invention can be practiced in a manner other than as specifically described herein. In the embodiment above, various improvement are disclosed. When a certain effect can be accomplished without some elements shown in this embodiment, it is not always necessary to provide such elements in accomplishing the embodiment consistent with the present invention.

For example, the reference data and the image data are binarized in the above embodiment. However, these data may be converted to many-valued, such as three-valued or four-valued. In addition, a defect is extracted using the differential data. But, other ways such as a way using absolute value or a minimax method may be used.

The oblique scanning can be also omitted because it is possible to measure the pattern width by scanning only the longitudinal and lateral directions.

A second embodiment consistent with the present invention is explained next with reference to FIGS. 10 to 13. In addition to the function which sensitivity image data processor 9 has, a sensitivity image data processor (not shown) further has a function for amending an unnecessary gradation which is generated in producing the 45-degree and 135-degree directional scanned data.

The gradation referred to is a gradual variation of the value. This gradation is generated at the corner of circuit pattern 2 in scanning the reference data in an oblique direction such as 45-degree or 135-degree. The pattern width may not be reflected accurately at the corner where the gradation is generated. As a result, a reliability of an inspection may deteriorate.

Figure 10:
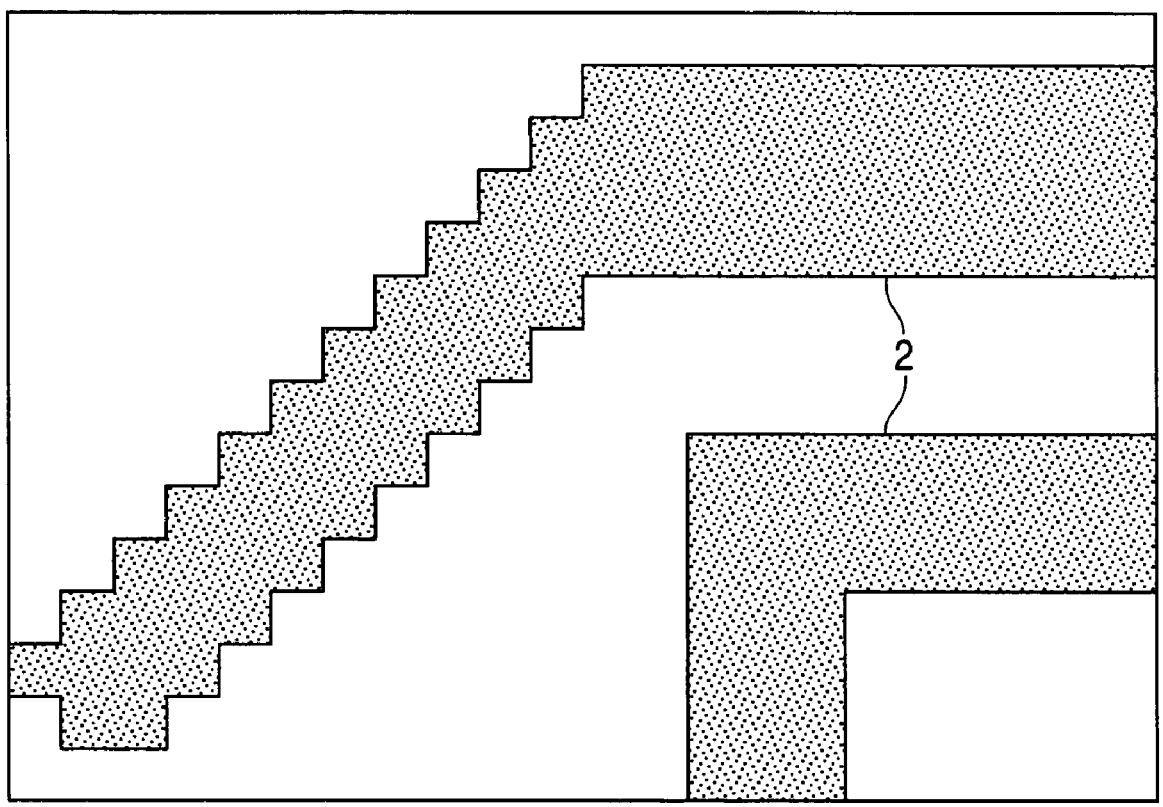
FIG. 10 shows another binarized reference data.

FIG. 10 shows binarized reference data, where metal circuit pattern 2 is shown in black.

Sensitivity image data processor 9A scans the binarized reference data in the 45-degree direction, and counts the number of pixels whose values are continuously black. Then, each pixel is given the counted number as shown in FIG. 11. As shown in FIG. 11, the value of the pixels around a corner C gradually varies. In other words, the gradation occurs around the corner C.

In order to amend the gradation, the method disclosed below is used for eliminating the gradation from the scanned data. More particularly, the differences between the values of adjacent pixels are computed among the one subject pixel and eight pixels around the subject pixel. Then, an average value Davg of the difference of the value is computed and evaluated according to a performance function (1).

$$D_{avg} = \left\{ \sum_{j=0,1,k=-1,0,1} D(I(x+j, y+k), I(x+j-1, y+k)) + \sum_{j=-1,0,1,k=0,1} D(I(x+j, y+k), I(x+j, y+k-1)) \right\}/12 \quad (1)$$

$$D(a, b) = |a - b - 1|$$

In function (1), the value of the subject pixel is shown as I(x,y). Similarly, the value of the pixels, in a longitudinal direction, adjacent to the subject pixel are shown I(x,y+1) or I(x,y−1). Further, the value of the pixels, in a latitudinal direction, adjacent to the subject pixel are shown I(x+1,y) or I(x−1,y). D(a,b) means the absolute value of the subtracted value of (a) from (b+1) as shown in the equation below function (1). Average value Davg is computed only when (a) and (b) is not equal to 0.

Average value Davg is 0 when the differences of the values between the adjacent pixels are +1, such as shown around corner C in FIG. 11. Therefore, when the pixel whose average value Davg is less or equal to a threshold, the gradation can be eliminated by converting the value of such pixels to 0. FIG. 12 shows the 45-degree direction scanned image data after the elimination. Eliminating the gradation generated around the corner of circuit 2 of the scanned data, makes it possible to obtain an accurate directional image data. As a result, the reliability of an inspection ca be improved.

Figure 13:
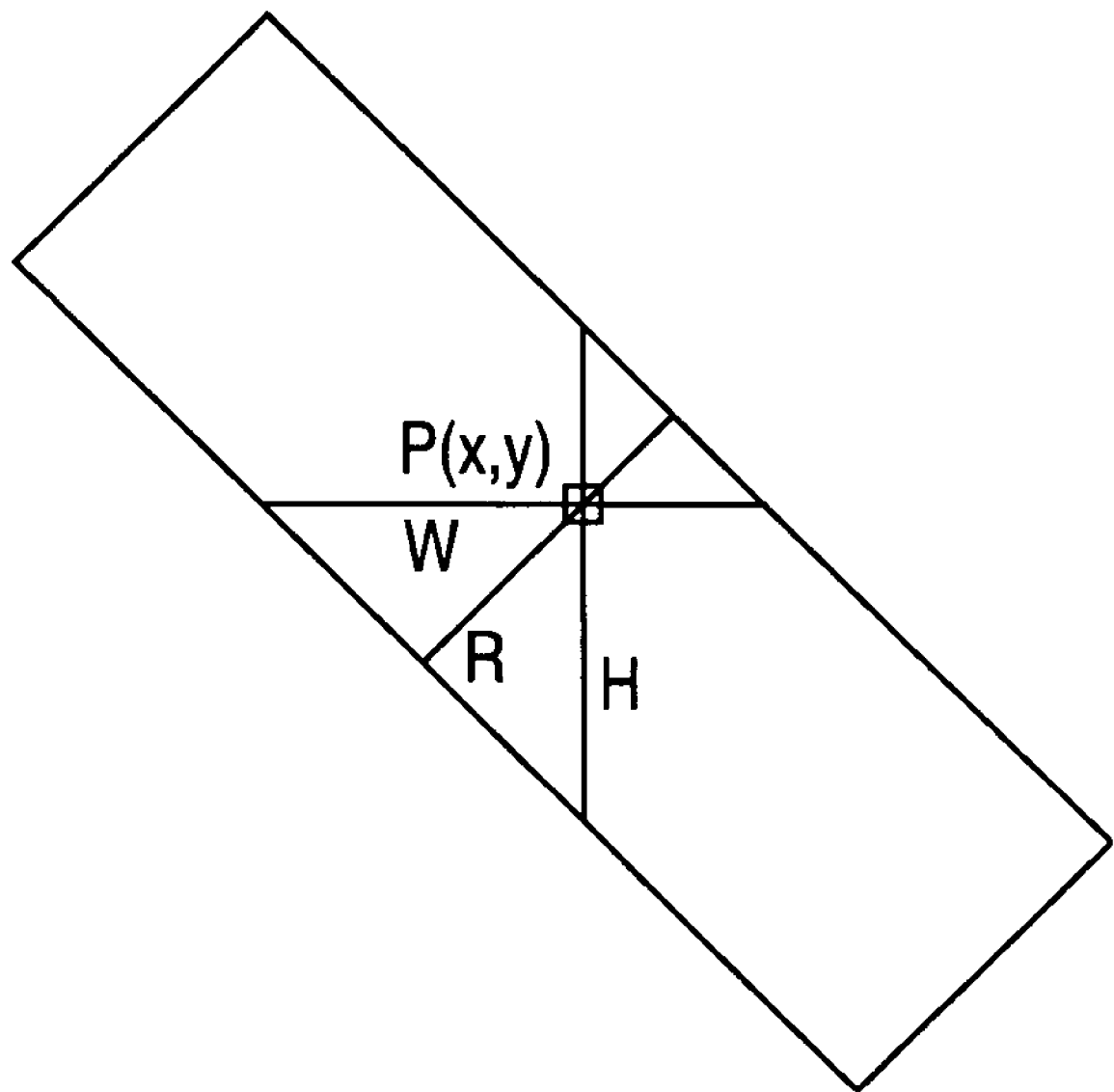
FIG. 13 shows a pattern width R at a position P.

Instead of using performance function (1) shown above, alternative methods may be used. For example, it is possible to adopt a value which is presumed based on the widths of longitudinal direction and latitudinal direction orthogonal to the longitudinal direction of pattern 2, as a width of pattern 2 in an oblique direction if the presumed value is almost the same as the width of pattern 2 in the oblique direction. FIG. 13 illustrates an example of the alternative method. As shown in FIG. 13, a pattern width at a position P (x,y) in the oblique direction, can be presumed based on a pattern width H in 0-degree and a pattern width W in 90-degree direction. Pattern widths Iw and Ig in the oblique direction can be presumed as shown in formulas (2) below.

$$Iw = \frac{W}{\sqrt{2}}, \; Ih = \frac{H}{\sqrt{2}} \quad (2)$$

When a real pattern width R in the oblique direction is larger or smaller than Iw or Ih by a limit deviation tolerance δ, the pattern is presumed not to extend in the oblique direction. Therefore, the pattern width at P(x,y) in the oblique direction is set to 0.

The above procedure is carried out against every position in a pattern. Then, some gradation at a corner may be eliminated so that the reliability of an inspection can be improved. Other methods can be applied. For example, a corner part can be counted in producing the directional image data by comparing the scanned data in the four directions. This method can also work to reduce the gradation.

The methods can be adopted to a variety of circuit patterns.

Numerous modifications of the present invention are possible in light of the above teachings. It is therefore to be understood that, within the scope of the appended claims, the present invention can be practiced in a manner other than as specifically described herein. In the embodiment above, various improvement are disclosed. When a certain effect can be accomplished without some elements shown in this embodiment, it is not always necessary to provide such elements in accomplishing the embodiment consistent with the present invention.

What is claimed is:

1. A method for inspecting a pattern comprising:
   measuring in a first direction, a first pattern width of a reference pattern at plural positions in the reference pattern;
   measuring in a second direction, a second pattern width of the reference pattern at the plural positions in the reference pattern;
   measuring, in a third direction, a third pattern width of the reference pattern at the plural positions in the reference pattern;
   comparing the first, second, and third pattern widths at each of the plural positions to determine a pattern width direction which is the shortest among the first, second, and third pattern widths at each of the plural positions;
   extracting a defect in a pattern to be inspected; and
   evaluating the defect based on the determined shortest pattern width of the position corresponding to a position of the defect.

2. A method for inspecting a pattern according to claim 1, wherein measuring the third pattern width comprises measuring the third pattern width in the third direction which deviates from both the first and second directions by 45-degree.

3. A method for inspecting a pattern according to claim 2, further comprising measuring, in a fourth direction, a fourth pattern width of the reference pattern at each of the positions in the reference pattern.

4. A method for inspecting a pattern according to claim 3, wherein measuring the fourth pattern width comprises measuring the fourth pattern width in the fourth direction which is perpendicular to the third direction.

5. A method for inspecting a pattern, comprising:
   measuring, in a first direction, a first pattern width of a reference pattern at plural positions in the reference pattern to acquire first scanning data;
   measuring, in a second direction, a second pattern width of the reference pattern at the plural positions in the reference pattern to acquire second scanning data;
   measuring, in a third direction, a third pattern width of the reference pattern at each of the plural positions in the reference pattern to acquire third scanning data;
   comparing the first, second, and third pattern widths at each of the plural positions to determine a shortest pattern width among the first, second, and third pattern widths at each of the plural positions;
   extracting a defect in a pattern to be inspected; and
   evaluating the defect based on the determined shortest pattern width of the position corresponding to a position of the defect.

* * * * *